Nov. 4, 1952     P. A. DRISCOLL     2,616,262
HYDRAULIC PISTON STOP
Filed March 11, 1950

INVENTOR.
PAUL A. DRISCOLL
BY *J. A. Gust*
ATTORNEY

Patented Nov. 4, 1952

2,616,262

UNITED STATES PATENT OFFICE 2,616,262

HYDRAULIC PISTON STOP

Paul A. Driscoll, South Bend, Ind., assignor to Bendix Aviation Corporation, South Bend, Ind., a corporation of Delaware Application March 11, 1950, Serial No. 149,089

7 Claims. (Cl. 60—54.5)

The present invention relates to a hydraulic brake valve device particularly suited for use in conjunction with aircraft disk brakes, and more particularly to a hydraulic valve device for limiting the projectile travel of the brake pistons.

The principal object of the present invention is to provide a follow-up valve device adapted to limit the projectile travel of the brake pistons to prevent their ejection from the piston chambers when the brake disks have worn a predetermined amount. In the past, the pistons have popped out of their respective chambers due to the worn condition of the brake disks, this usually happening during a brake application. If the pistons should pop out during an application which causes the brake elements to be heated to a relatively high temperature, brake fluid will squirt from the piston chambers onto the hot elements and ignite. It thus becomes highly desirable to provide a means which will reliably prevent the pistons from leaving their chambers.

Another object of this invention is to provide a simple piston stop which may be easily assembled to existing brake assemblies without necessitating any alteration in the design of the assembly or, at the most, necessitating only a slight change thereof.

Other objects will become apparent as the description proceeds.

Figure 1:
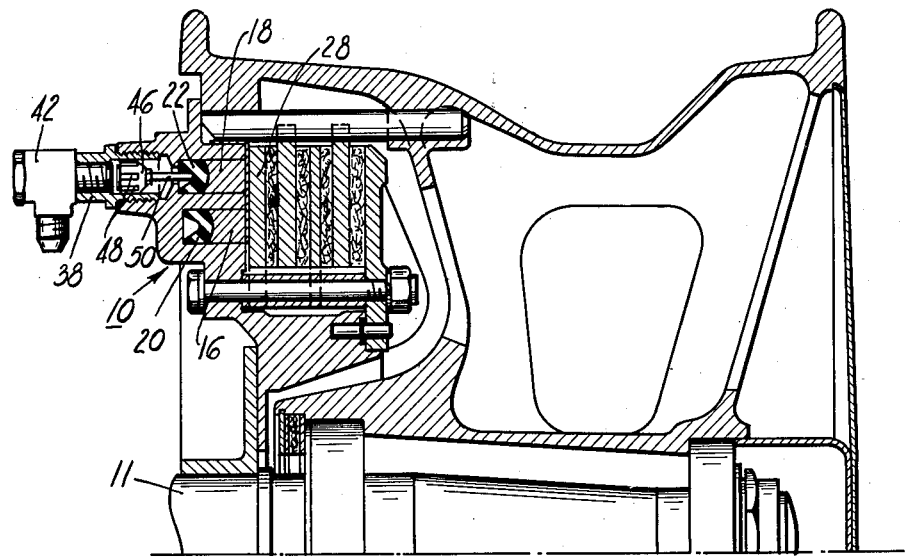
Figure 1 is an axial section of an embodiment of the present invention assembled in a typical disk brake assembly shown in part axial section.
Figure 2:
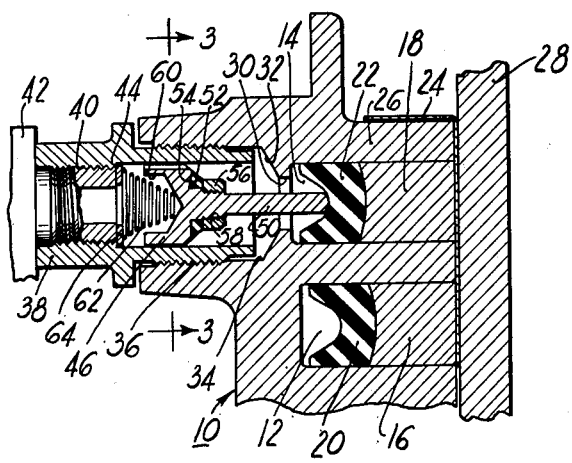
Figure 2 is an enlargement of the embodiment of Figure 1.
Figure 3:
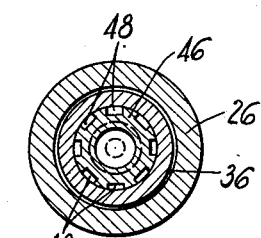
Figure 3 is a sectional view taken substantially on section line 3—3 of Figure 2.

Referring now to the drawing, the hydraulic actuator supporting structure 10, hereinafter referred to as a carrier, may be of annular form, with the central opening thereof encircling a stub axle 11 or the like of a vehicle. This carrier 10 may either be secured to a rigid portion of the vehicle or may rotate, depending upon the brake design preferred. In the present instance and for purposes of illustration only, it is assumed that the carrier is nonrotatable, being rigidly secured in a suitable manner to a landing gear strut or the like depending from the underside of an airplane.

The carrier 10 is provided with a pair of concentric axially extending annular chambers 12 and 14 receiving a pair of reciprocable pistons 16 and 18, respectively. Annular sealing members 20 and 22 are received on the heads of pistons 16 and 18, respectively, to prevent the leakage of fluid around these pistons. An annular cup shaped dust shield 24, usually fabricated of sheet metal, is telescoped over the portion 26 of carrier 10 to cover the open ends of the piston chambers 12 and 14. The purpose of this shield 24 is to keep lining dust and other foreign matter out of these chambers. Mounted next to the bottom portion of shield 24 is the annular brake pressure plate 28 which is usually capable of axial movement only with respect to carrier 10. Thus if the pistons 16 and 18 are forced outwardly, the pressure plate 28 will be carried a corresponding distance.

In the rear end of chamber 14 is provided a circular opening or port 30. Extending from the perimeter of this opening 30 is a frusto-conical shaped valve seat 32 which has its outer peripheral portion joining the bore 34 which is threaded at 36. An externally threaded sleeve 38 is received by threads 36 and is provided with a reduced inner diameter end portion 40 adapted to threadedly receive the nipple of the union or connector 42. This reduced diameter portion 40 provides a shoulder 44 inside sleeve 38 which serves a function to be described hereinafter.

A valve 46 provided with a plurality of circumferentially spaced axially extending grooves 48 is reciprocably received within the sleeve 38. The purpose of these grooves is to allow passage of fluid around valve 46 which communicates with the interiors of the chambers 12 and 14. It may be stated at this point, that the chambers 12 and 14 are connected on the piston side of the opening 30 so that closure of this opening 30 will prevent the communication of any fluid pressure to either of the pistons 16 or 18.

A spacer member or stem 50 is coaxially formed on valve 46 and is of a length to extend through port 30 and to contact the dished portion of sealing member 22. Thus it is seen that the position of valve 46 within sleeve 38 is determined by the axial position of the piston 18.

The portion of valve 46 which comes into contact with the valve seat 32 is constituted by a rubber or the like sealing ring 52 which is received in a coaxial, annular socket 54 in valve 46 and held in place by means of a nut 56 received on stem threads 58. At the other end of valve 46 is formed a socket or recess 60 which receives one end of a frusto-conical shaped compression spring 62, the other end of which bears against a washer 64 abutting against the previously described shoulder 44. By means of this spring 62, the valve 46 is constantly urged toward the pistons but is kept in spaced relation therewith by means of the stem 50.

In operation, as the linings on the brake disks wear or the brake disks themselves wear thin, the pistons 16 and 18 must project farther out of their respective chambers to effect a brake application. Thus when the aggregate brake disk wear is greater than the length of the pistons, an application of the brakes will obviously force them out of their chambers, allowing brake fluid to spray onto the adjacent brake parts. As explained previously, if these brake parts are sufficiently hot, the fluid will ignite resulting in possible serious damage to the vehicle upon which the brakes are carried.

In order to stop the outward movement of the pistons, the fluid pressure applied to the heads of the pistons is cut off, the point of cut off being determined by the length of the stem 50. As the piston 18, for example, moves outwardly, the valve 46 moves a corresponding amount under the influence of spring 62 until the rubber seal 52 engages the valve seat 32. Additional pressure fluid is thereby prevented from communicating with the pistons and causing further outward movement.

After release of the brakes, the fluid pressure communicated to the heads of the pistons through the connecting member 42 is relieved allowing the conventional brake return springs (not shown), which are usually connected to the annular pressure plate 28, to force the pistons 16 and 18 back into their chambers thereby opening the port 30 and allowing the hydraulic fluid to flow back into the brake system master cylinders (not shown).

While the foregoing illustration and description discloses the present invention as being embodied in a brake utilizing two concentric annular chambers, it is understood as being obvious that the valve arrangement of the present invention is not limited to any such number of cylinder chambers but may be used with any type of a reciprocable actuator, whether it be of the annular or cylindrical type, to produce the desired result.

The valve portion 46 of the present invention may be combined with the sleeve 38 to form a subassembly which could be fitted into present existing threaded outlets such as the one illustrated at 36. While it is understood that the outlets similar to that illustrated at 36 will vary in size, it is but a matter of mechanical skill to vary the size of the threaded portion of sleeve 38 to provide the desired fit. The present invention thus lends itself to economy of manufacture because of its simple design which need vary only in size to fit the various brake designs which may call for a safety means for preventing the pistons from leaving their respective chambers.

Although only one embodiment of the invention has been illustrated and described, various changes in the form and relative arrangements of the parts may be made to suit requirements.

I claim:

1. In a disk brake assembly, a carrier having a pair of concentric annular axially extending piston chambers, a pair of annular pistons reciprocably received in said chambers, a pair of annular sealing members seated on the heads of said pistons to prevent the leakage of fluid around said pistons, an annular valve seat surrounding an opening in the closed end of one of said chambers, an internally threaded passage coaxially extending from the outer perimeter of said valve seat, an externally threaded sleeve received in said passage having a threaded reduced inner diameter portion near the outer end thereof adapted to receive a connecting union, a valve slidably received in said sleeve and having a plurality of circumferentially spaced axially extending grooves in its outer periphery, a stem coaxially secured to said valve and passing through said opening into disconnected engagement with the respective sealing member, said stem being of such length that said valve will seat to close said opening when said pistons have moved on their projectile stroke a predetermined distance, and a helical spring bearing at one end on a part of said sleeve and biasing said valve toward seated position.

2. In a disk brake assembly, a carrier having an annular axially extending piston chamber, an annular piston reciprocably received in said chamber, an annular sealing member seated on the head of said piston to prevent the leakage of fluid around said piston, a valve seat surrounding an opening in the closed end of said chamber, an internally threaded passage extending from the outer perimeter of said valve seat, an externally threaded sleeve received in said passage having a reduced inner diameter portion near the outer end thereof adapted to receive a connecting union, a valve slidably received in said sleeve and having a plurality of axially extending lands and grooves in its outer periphery, a stem coaxially secured to said valve and passing through said opening into disconnected abutting contact with said sealing member, said stem being of such length that said valve will seat to close said opening when said piston has moved on its projectile stroke a predetermined distance, and a compression spring bearing at one end on a part of said sleeve and biasing said valve toward seated position.

3. In a disk brake assembly, a carrier having a plurality of interconnected axially extending piston chambers, a plurality of pistons reciprocably received in respective chambers, a plurality of sealing members seated on the heads of respective pistons to prevent the leakage of fluid around said pistons, an annular valve seat surrounding an opening in the closed end of one of said chambers, an internally threaded passage coaxially extending from the outer perimeter of said valve seat, an externally threaded sleeve received in said passage having a threaded reduced inner diameter portion near the outer end thereof adapted to receive a connecting union, a valve slidably received in said sleeve and having a plurality of circumferentially spaced axially extending grooves in its outer periphery, a stem coaxially secured to said valve and passing through said opening into disconnected contact with the respective sealing member, said stem being of such length that said valve will seat to close said opening when said pistons have moved on their projectile stroke a predetermined distance, and a helical spring bearing at one end on a part of said sleeve and biasing said valve toward seated position.

4. In a disk brake assembly, a carrier having an axially extending piston chamber, a piston reciprocably received in said chamber, a sealing member seated on the head of said piston to prevent the leakage of fluid around said piston, a valve seat surrounding an opening in the closed end of said chamber, an internally threaded passage extending from the outer perimeter of said valve seat, an externally threaded sleeve received in said passage having a reduced inner diameter portion near the outer end thereof adapted to receive a connecting union, a valve slidably received in said sleeve and having fluid passing means in its outer periphery, a stem coaxially secured to said valve and passing through said opening into abutting contact with said sealing member, said stem being of such length that said valve will seat to close said opening when said piston has moved on its projectile stroke a predetermined distance, and resilient means interposed between said sleeve and said valve biasing said valve toward seated position.

5. In a disk brake assembly, a carrier having at least one piston chamber reciprocably receiving a piston, a sealing member seated on the head of said piston to prevent the leakage of fluid around said piston, the closed end of said chamber having a fluid pressure port with the perimeter thereof serving as a valve seat, a bore extending from the outer peripheral portion of said valve seat to threadedly receive a sleeve, a valve reciprocably received in said sleeve adapted to close said port by engagement with said valve seat, fluid passing means associated with said valve, a stem secured to said valve and passing through said port into disconnected abutting engagement with said sealing member, said stem normally spacing said valve from said port, and means acting between said sleeve and said valve yieldably urging said valve toward said port.

6. In a disk brake assembly, a carrier having at least one piston chamber reciprocably receiving a piston, the closed end of said chamber having a fluid pressure port with the perimeter thereof serving as a valve seat, a bore extending from the outer peripheral portion of said valve seat to threadedly receive a sleeve, a valve reciprocably received in said sleeve adapted to close said port by engagement with said valve seat, fluid passing means associated with said valve, a stem secured to said valve and passing through said port into disconnected abutting engagement with said piston, said stem normally spacing said valve from said port, and means yieldably urging said valve toward said port.

7. In a disk brake assembly, a carrier having at least one fluid pressure actuator, said actuator being provided with a fluid pressure port with one portion of said port serving as a valve seat, a valve adapted to close said port, fluid passing means associated with said valve, and a spacer member associated with said valve adapted to pass through said port to disconnectedly engage said actuator, said spacer member normally holding said valve away from said port.

PAUL A. DRISCOLL.

REFERENCES CITED

The following references are of record in the file of this patent:

UNITED STATES PATENTS

| Number | Name | Date |
|---|---|---|
| 612,324 | Frazier et al. | Oct. 11, 1898 |
| 2,209,343 | Masteller | July 30, 1940 |
| 2,423,882 | Frank | July 15, 1947 |